United States Patent
Mo et al.

(10) Patent No.: US 8,028,120 B2
(45) Date of Patent: Sep. 27, 2011

(54) SYSTEM WITH FLASH MEMORY DEVICE AND DATA RECOVERY METHOD THEREOF

(75) Inventors: Yeon-Jin Mo, Gangnam-gu (KR);
Jang-Hwan Kim, Suwon-si (KR);
Dong-Hyun Song, Yongin-si (KR);
Shea-Yun Lee, Gangnam-gu (KR);
Jae-Hyun Hwang, Seocho-gu (KR);
Myung-Jin Jung, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 690 days.

(21) Appl. No.: 11/653,986

(22) Filed: Jan. 17, 2007

(65) Prior Publication Data

US 2008/0104308 A1     May 1, 2008

(30) Foreign Application Priority Data

Oct. 25, 2006    (KR) ........................ 10-2006-0104152

(51) Int. Cl.
*G06F 12/00* (2006.01)
*G06F 12/02* (2006.01)
*G06F 12/16* (2006.01)

(52) U.S. Cl. ........ 711/103; 711/165; 711/170; 711/202; 711/205; 711/206; 711/207

(58) Field of Classification Search ................... 711/103, 711/165, 170, 202, 205, 206, 207
See application file for complete search history.

(56) References Cited

U.S. PATENT DOCUMENTS

| 2006/0156078 | A1  | 7/2006 | Baumhof et al. |
| 2007/0033332 | A1* | 2/2007 | Sinclair et al. ................. 711/103 |
| 2008/0005462 | A1* | 1/2008 | Pyeon et al. .................... 711/113 |
| 2008/0140738 | A1* | 6/2008 | Blandy .......................... 707/206 |
| 2011/0106804 | A1* | 5/2011 | Keeler et al. ................... 707/737 |

FOREIGN PATENT DOCUMENTS

| KR | 06-150673 | 5/1994 |
| KR | 09-293025 | 11/1997 |
| KR | 2003-036209 | 2/2003 |
| KR | 1020030040817 A | 5/2003 |
| KR | 2005-056144 | 3/2005 |
| KR | 1020050076156 | 7/2005 |

* cited by examiner

*Primary Examiner* — Midys Rojas
(74) *Attorney, Agent, or Firm* — Volentine & Whitt, PLLC (57) ABSTRACT

A method is for recovering a block mapping table in a system including a flash memory device, where the block mapping table utilizes address mapping in accordance with a wear-leveling scheme. The method includes reading block arrangement information from the flash memory device for the wear-leveling scheme, restoring the block mapping table with reference to allocation block information included in the block arrangement information and scanning address allocation information included in spare regions of erased blocks of the flash memory device with reference to erased block information included in the block arrangement information and updating the block mapping table in accordance with the scanned address allocation information.

25 Claims, 8 Drawing Sheets

SYSTEM WITH FLASH MEMORY DEVICE AND DATA RECOVERY METHOD THEREOF

BACKGROUND

The present invention generally relates to storage media, and more particularly, the present invention relates to a method and system for recovering data in a nonvolatile memory.

A claim of priority under 35 U.S.C. §119 is made to Korean Patent Application No. 2006-104152, filed Oct. 25, 2006, the entire contents of which are hereby incorporated by reference.

Flash memories are typically classified as either NOR type or NAND type depending upon the manner in which memory cells are interconnected with bit lines. NOR flash memories are capable of relatively fast read operations, and hence are often utilized for code storage. On the other hand, NAND flash memories are capable of relatively high write frequencies, and are often employed as low-cost, high capacity data storage media.

In both NOR type and NAND type flash memories, each unit memory cell must be in an erased state prior to programming. In addition, erase functions are typically executed in units of erase blocks or erase zones containing large quantities of memory cells. These and other characteristics of flash memory necessitate the use of a "flash translation layer" (FTL) between the flash memory and the file system of the device. FTL generally functions to conceal the erase operations of the flash memory, and to emulate a storage device such as a disc drive or other mass-storage device. For example, during a write operation, the FTL functions to map physical addresses of the flash memory with logical addresses generated by the file system. In order to achieve a fast mapping operation, FTL uses an address mapping table typically composed of static random access memory (RAM). The address mapping function of FTL allows a host to identify flash memory as a hard disk drive (HDD) or static RAM, and to access the flash memory in the same manner as an HDD or static RAM.

Figure 1:
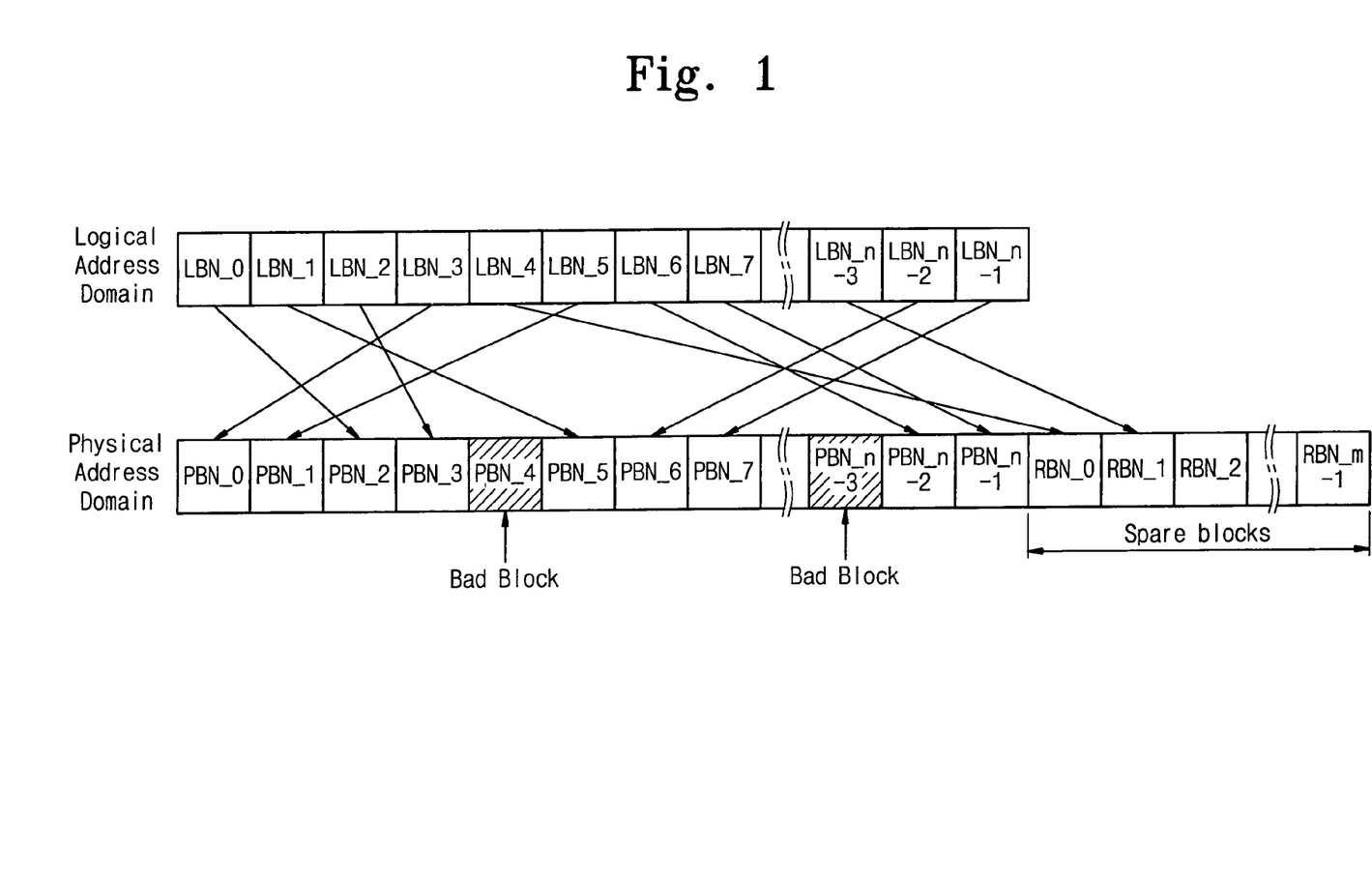
FIG. 1 is a diagram for explaining a virtual block mapping scheme.

As an example of block address mapping by FTL, FIG. 1 is a diagram showing of a virtual block mapping scheme. As shown, "n" logical address domain blocks LBN_0 through LBN_n-1 are mapped to "n+m" physical address domain blocks PBN_0 through PBN_n-1 and RBN_0 through RBN_m-1. The "m" physical address domain blocks in excess of the "n" logical domain blocks may be deemed spare blocks which are utilized in place of abnormal ("bad") blocks.

Mapping of the logical address domain blocks to the physical address domain blocks is dynamic in the sense that the mapping of the logical address domain blocks to the physical address domain blocks is not fixedly defined. For example, a "wear-leveling" scheme may be adopted to prolong the life of the memory blocks of the flash memory. For example, wear-leveling may include storing information indicative of an erase count for each memory block, and assigning logical block addresses to those memory blocks having the smallest erase counts In the meantime, upon the occurrence of an inadvertent power loss (e.g., power failure), it is necessary during reboot to recover and restore the FTL mapping information. This is conventionally done by executing a process in which mapping information from a specific field included in each block is read by scanning all blocks, and then restoring a mapping table composed in RAM (random access memory). This process suffers the disadvantage of consuming time and resources during reboot.

SUMMARY OF THE INVENTION

According to an aspect of the present invention, a method for recovering a block mapping table in a system including a flash memory device is provided, where the block mapping table utilizes address mapping in accordance with a wear-leveling scheme. The method includes reading block arrangement information from the flash memory device for the wear-leveling scheme, restoring the block mapping table with reference to allocation block information included in the block arrangement information and scanning address allocation information included in spare regions of erased blocks of the flash memory device with reference to erased block information included in the block arrangement information and updating the block mapping table in accordance with the scanned address allocation information.

According to another aspect of the present invention, a memory system is provided which includes a nonvolatile memory device which stores block arrangement information, a central processing unit, and a random access memory which stores a block mapping table configured to allocate physical block addresses of the nonvolatile memory device in correspondence with logical block addresses provided from the central processing unit, where the block mapping table utilizes address mapping in accordance with a wear-leveling scheme. The central processing unit restores the block mapping table with reference to allocation block information included in the block arrangement information of the nonvolatile memory device, locates address information included in spare regions of erased blocks with reference to erased block information, and updates the block mapping table according to the located address information.

According to yet another aspect of the present invention, a system is provided which includes a central processing unit, a hybrid hard disk which stores data and includes a nonvolatile cache memory, and a random access memory which stores a block mapping table configured to allocate physical block addresses of the nonvolatile cache memory in correspondence with logical block addresses provided from the central processing unit, where the block mapping table utilizes address mapping in accordance with a wear-leveling scheme. The central processing unit restores the block mapping table with reference to allocation block information included in the block arrangement information of the nonvolatile cache memory, locates address information included in spare regions of erased blocks with reference to erased block information, and updates the block mapping table according to the located address information.

BRIEF DESCRIPTION OF THE FIGURES

Non-limiting and non-exhaustive embodiments of the present invention will be described with reference to the accompanying figures, wherein like reference numerals refer to like parts throughout the various figures unless otherwise specified. In the figures.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Like reference numerals refer to like elements throughout the accompanying figures.

According to embodiments of the present invention, during reboot after a power loss, recovery of the mapping table is carried out by utilizing a wear-sorted block list (WSBL) (i.e., block arrangement information) stored in the flash memory device. First, address information of assigned blocks storing effective data included in the WSBL is recovered. Then, with reference to address information, an overall data structure at the time at which the power loss occurred is restored at high speed from searching address mapping information recorded in spare fields of blocks corresponding thereto.

A method of recovering a block mapping table after a power loss of a flash memory device in accordance with an embodiment of the present invention will now be described with reference to FIG. 2.

Figure 2:
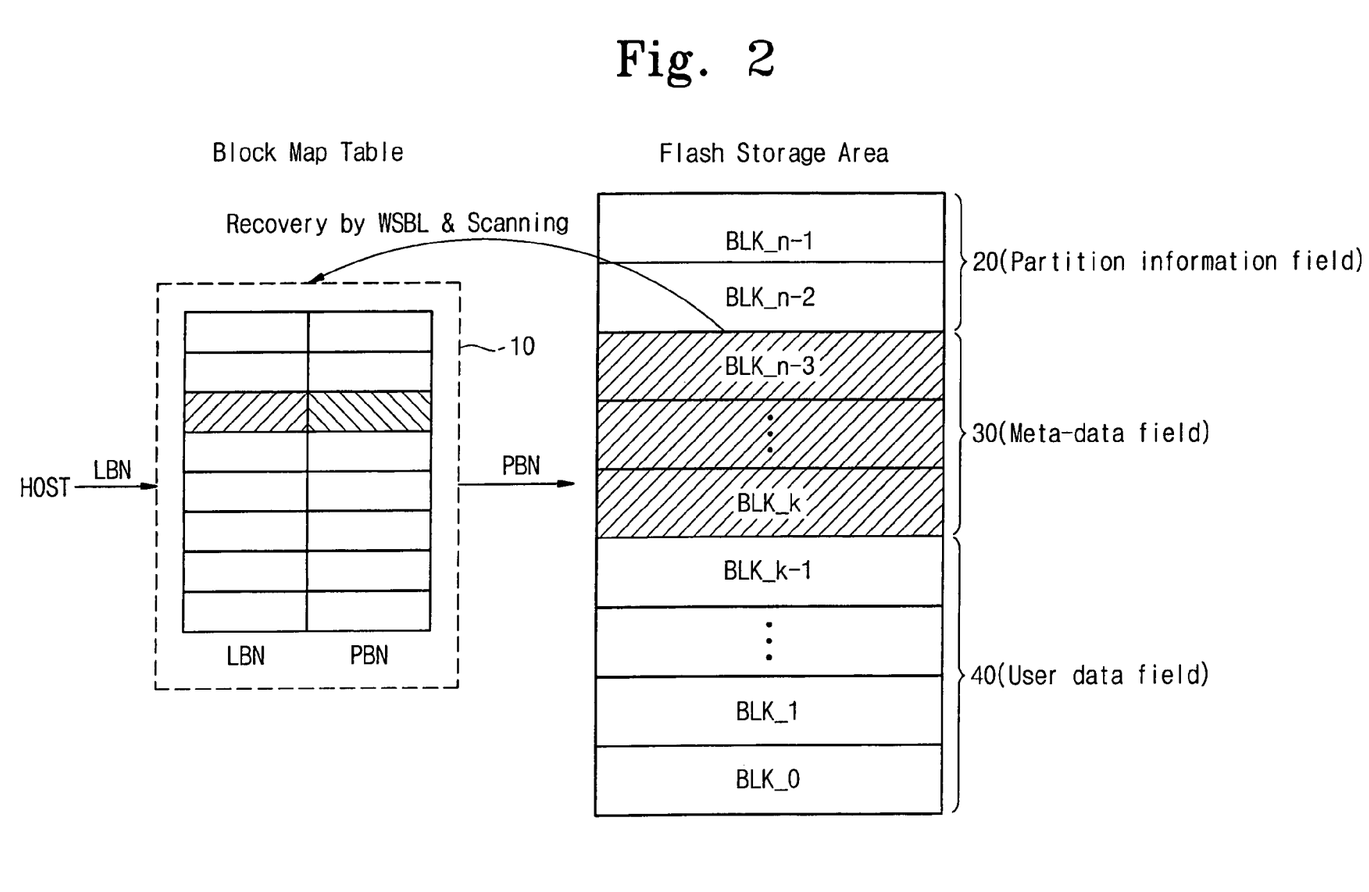
FIG. 2 is a diagram for explaining a method of recovering a block mapping table in accordance with an embodiment of the present invention.

FIG. 2 illustrates a block mapping table 10 and a flash memory storage area. As shown, the block mapping table includes logical address LBN which are mapped to physical addresses PBN. A logically addresses supplied, for example, for a host device is translated by the mapping table 10 into a physical address PBN. The physical address PBN identifies one of plural memory blocks BLK_0 through BLK n−1 of the flash memory storage area.

The block mapping table 10 may be formed by the RAM of a system, such as a mobile device or a computer, and stored in the flash memory device periodically or in compliance with a command from a host.

The blocks BLK_0 through BLKn−1 each constitute an erase unit of the flash memory device. Further, each block includes plural pages, and each page constitutes a write unit of the flash memory device. In the example of FIG. 2, the blocks BLK_0 through BLKn−1 are divided into a partition information field 20, a meta-data field 30, and a user data field 40. The partition information field 20 stores partition information relating to all files of the flash memory, and information relating to the locations of bad blocks. The meta-data field 30 contains mapping information with logical addresses provided from the host and physical addresses of the flash memory, and a wear-sorted block list WSBL. The user data field 40 is provided for storing data input from the host. Each of the blocks of the respective fields may include a main region for storing data, and a spare region for storing information relating to the data of the main region.

Hereinafter will be described the mapping table recovery method of the present invention by an example using the flash memory device as a cache memory of a hard disk drive (HDD). The flash memory device assists an operation of garbage collection that fills up a block with data scattered over the blocks. Also, it also offers a flush operation that stores cache data into a disk from the flash memory device used as a cache. The block mapping table 10 is formed on a RAM of a system equipped with the flash memory device, organizing a file system. The block mapping table 10 is reserved in a specific field of the flash memory device upon every modification thereof and is utilized as data for recovery when a failure occurs. However, this operational mode of storing modified data into the flash memory device upon every modification of the block mapping table 10 creates substantial operational overhead. Thus, to reduce operational overhead, it is possible to change an update condition of the block mapping table 10. Further, the WBSL included in the flash memory device may be updated only when a garbage collection or flush operation is generated. A system of embodiments of the present invention first recovers (or restores) a mapping table by means the WBSL. Further, mapping information modified after updating the WSBL before a power loss is restored by way of a scanning operation for reading mapping information by directly accessing a corresponding block with reference to wear counts of the WSBL.

As such, the recovery of the block mapping table 10 upon the generation of a power loss is accomplished with reference to a WSBL with a relatively smaller update count. Referring to the WSBL (i.e., block arrangement information), the block mapping table 10 is first recovered at a time of updating the WSBL. Then, a sequence is conducted of searching for space fields to erased blocks with reference to WSBL information, and reading out block address information modified from a WSBL update time to a time of power loss. Further, with reference to the modified block address information read out, the block mapping table 10 can be restored into the state of the power loss time.

Figure 3:
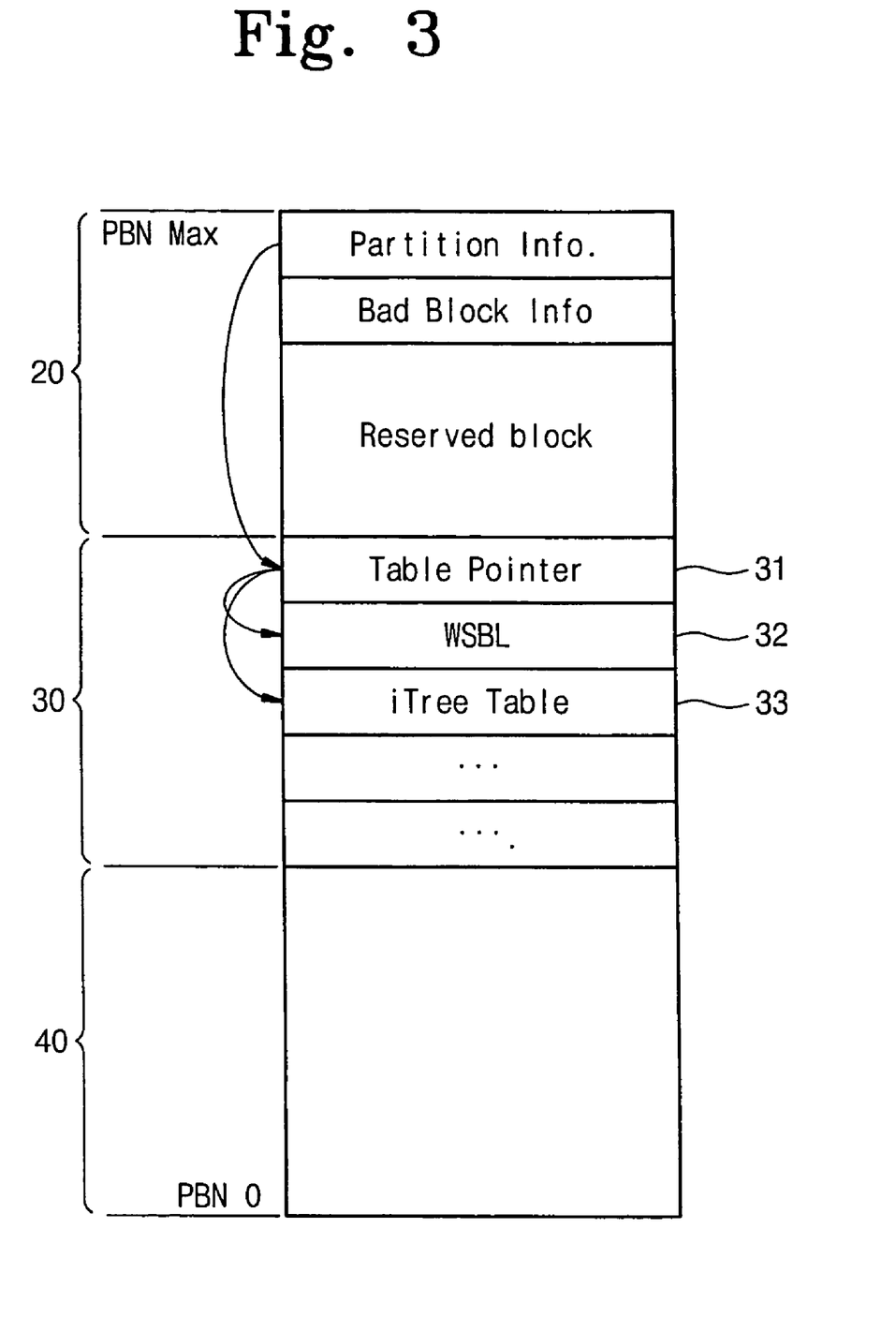
FIG. 3 is a diagram illustrating an exemplary configuration of a flash storage area shown in the diagram of FIG. 2.

FIG. 3 is a schematic diagram illustrating an exemplary configuration of the flash storage area shown in FIG. 2. Referring to FIG. 3, as described previously, the flash storage area is comprised of the partition information field 20, the meta-data field 30, and the user data field 40.

The partition information field 20 contains partition information for divisionally managing a physical memory region. The partition information is read out by a file system and mounted on the RAM of the system. Further, bad block information is provided to the partition information field 20 and mounted thereon while forming the block mapping table.

The meta-data field 30 includes a table pointer region 31 having positional information thereof. The meta-data field 30 also includes a region 32 containing the wear-leveling information (WSBL). The wear-leveling information region (WSBL) 32 stores partition information of blocks to be arranged on the basis of an erasing count. A tree table 33 contains mapping and sector address information of blocks of the flash memory device. The tree table 33 becomes substantial data forming the block mapping table 10.

The user data field 40 is composed of blocks corresponding to physical addresses assigned by the block mapping table 10, for storing input data. Also, the WSBL of the wear-leveling information region 32 and the tree table 33 are updated during a flush or garbage collection operation generated while storing input data into the user data field 40.

According to the file system of embodiments of the present invention, the WSBL is updated into the flash memory with the latest information formed in the RAM during a flush or garbage collection operation. Also, the tree table 33 is promptly updated in the RAM when there is generated a change of tree information, but the flash memory is renewed only with periodically modified information. Recovering the block mapping table in the RAM is to return the tree table 33 to the former state when a power loss has occurred. The memory device according to embodiments of the present invention is able to first restore the tree table 33 by means of the WSBL when a power loss occurs, and then to recover the former state of the tree table 33 organized in the RAM before the power loss by means of the least block scanning operation.

Figure 4:
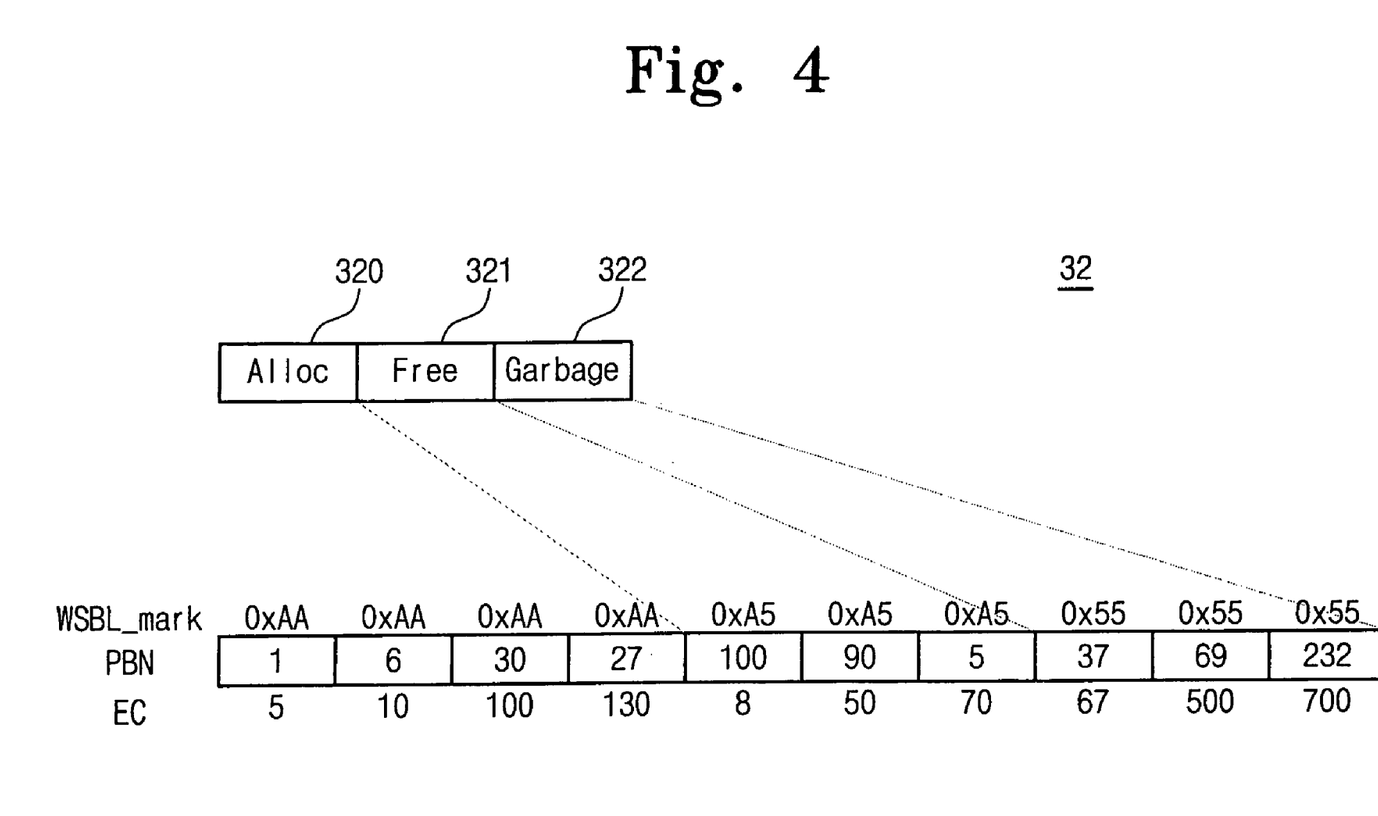
FIG. 4 is a diagram for explaining a wear-sorted block list (WSBL) shown in the diagram of FIG. 3.

FIG. 4 is a block diagram illustrating an example of the wear-sorted block list (WSBL) shown in FIG. 3. Referring to FIG. 4, the WSBL is comprised of an allocation information area (Alloc) 320, a free information area (Free) 321, and a garbage information area (Garbage) 322.

The allocation information area 320 stores information about a block in which data transferred from the host have been already programmed and thereby stored therein. A mode of storing data at this time accords to an order of the erasing count (hereinafter, referred to as EC). Namely, a block with a lower EC is first allocated prior to a logical block address LBN provided from the host. On blocks included in the allocation information area 320, notations of WSBL_mark by 0xAA are present to represent that data programmed in the blocks are valid.

In the free information area 321, overall information about erased blocks, i.e., free blocks, are set to be arranged on the basis of EC size. The physical addresses PBN are assigned to blocks with a lower EC, prior to the logical addresses LBN provided from the host. The free blocks are noticed with WSBL_mark by 0xA5.

The garbage information area 322 is organized to store information about blocks designated for the garbage collection generated in the system, i.e., information about garbage blocks. The garbage collection is a systemic operation for detecting and removing objects of data conditioned in no more use. The garbage collection is automatically enabled whenever a memory capacity available by a file system falls under a specific level. The automatic garbage collection finds that there are correlations between all objects of data, and then data or blocks irrelative to cache data of the flash memory are signified by a garbage mark 0x55. During this, locations of the garbage-marked data may be data in the unit of a page or block. The data signified by the garbage mark 0x55 are regarded as unnecessary data, representing that those correspond to memory regions to be returned to the system. Thus, memory regions with the garbage mark 0x55 are those to be erased. If the blocks with the garbage marks 0x55 are erased, a mark changes to indicate those as free blocks (or erased blocks). The erased blocks may be also allocated to correspond with logical block addresses externally provided in accordance with their EC.

Now, referring to the aforementioned configuration and arrangement of the WSBL, it is possible to restore the block mapping information, corresponding to the time when a flush or garbage collection operation has occurred, by reading the WSBL from the flash memory. This is because the allocation information area 320 of the WSBL includes information in which physical block addresses to logical block addresses of the time when the flush or garbage collection has occurred are arranged in the order of EC. However, if a power loss occurs after the flush or garbage collection operation, the WSBL is insufficient to completely restore the mapping table of the time when the power loss has occurred. Namely, it needs to additionally scan erased blocks of the free information area 321 of the WSBL in the order of EC in order to accomplish the successful recovery of block mapping table.

Figure 5:
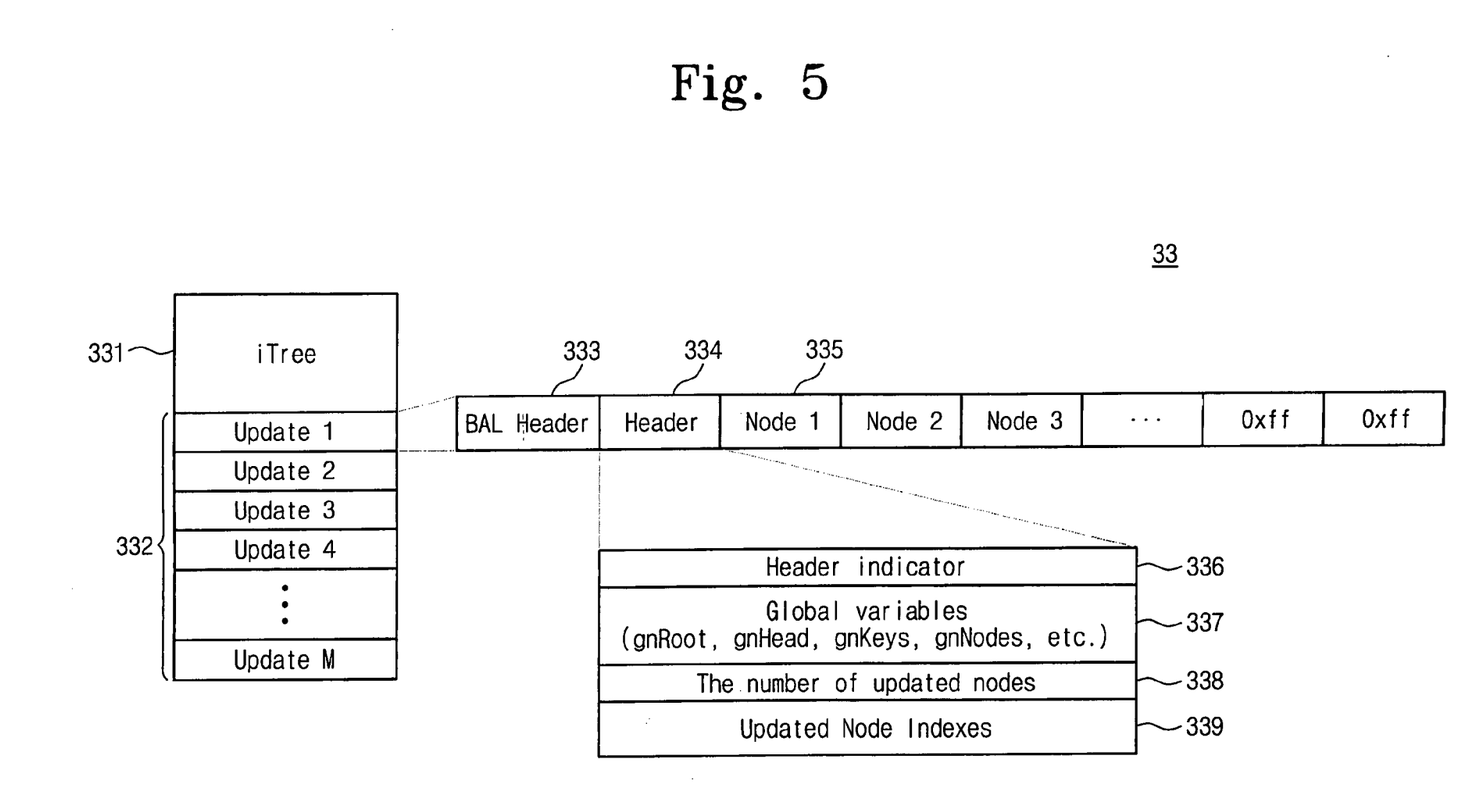
FIG. 5 is a diagram for explaining a tree information region shown in the diagram of FIG. 3.

FIG. 5 is a schematic diagram illustrating the tree information region (i.e., the tree table) 33 storing address information (or mapping information) of all files or blocks. Referring to FIG. 5, the tree region 33 contains tree information (iTree) relating to a file system of the flash memory. The tree information (iTree) contains address mapping information. In particular, the tree information (iTree) is used in organizing a tree for file management and layer architecture of the file system which is loaded on the RAM. The tree information (iTree) stored in the tree region includes files necessary for booting the system and mounting other file systems. These files are loaded in the RAM of the system, forming a tree structure. As a result, the feature of recovering data by rebooting the system means to restore the tree structure (iTree) of the RAM into the tree structure corresponding to the state just before the power failure. The tree region 33 containing the tree information (iTree) of the file system of the flash memory is composed of a backup area 331 storing tree information backed up when normal power is interrupted while booting the system, and update areas 332 (Update 1~Update M) storing tree information modified later. As the flash memory device is operable in a one-time programming mode, it is not possible to overwrite data into memory cells thereof. Thus, modified tree information is written into the update areas. While updated information may be written in the unit of a page, other memory units may be written instead.

Data programmed into the update areas 332 includes information modified for the tree information mounted on the RAM. A header area (Header) 334 contains general ID information 336, variables 337, information 338 representing the number of updated nodes, and updated node indexes 339.

In the tree region 33 of the flash memory device, having such a data structure, tree information (iTree) is stored in the backup area (or tree information area) in correspondence with the first block mapping table. Thereafter, sequentially updated tree information areas form the tree structure. When there is no space to be written in the tree information area, the tree information area 331 is erased and then programmed with the latest tree information present in the RAM.

Figure 6:
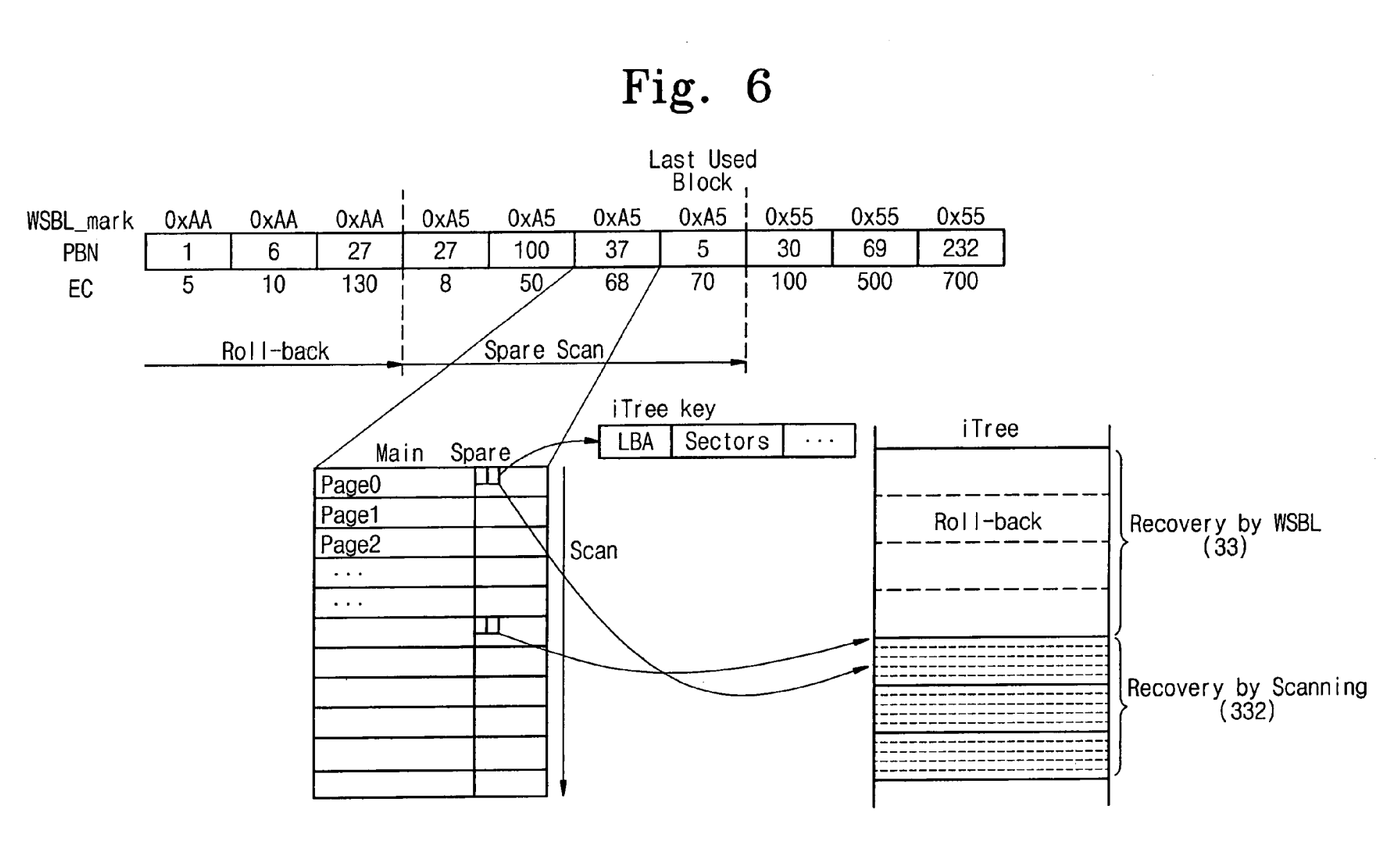
FIG. 6 is a diagram for explaining a recovery operation for the tree information region in accordance with an embodiment of the present invention.

FIG. 6 is a block diagram illustrating a recovery operation for the tree information region 33 by means of WSBL according to embodiments of the present invention. Referring to FIG. 6, in the file system, if the system is rebooted after inadvertent power loss, the backup area 331 of the tree region is restored by means of the allocation block information 320 of the WSBL 32 (refer to FIG. 5), and thereafter the update area 332 is restored with general tree information or block mapping table by scanning pages with reference to the free information area 321.

If the system is rebooted, the last updated WSBL is read out from the flash memory device and tree information is restored on basis of the last updated WSBL. This corresponds with the backup area 331 of the tree region 33. Through the read-out operation of WSBL are all restored tree region data to the block PBN27. Then, a scanning operation is carried out for the remaining blocks excluded from the allocation information area 320 of the WSBL 32. This operation is accomplished by scanning free blocks, which are included in the WSBL, with reference to EC. Thus, it obtains tree information from the latest update of the WSBL to the power loss by way of directly accessing the free blocks in the order of EC and reading the tree information from the spare regions.

FIG. 6 exemplarily shows the scanning operation for the block PBN37. This block scanning operation may correspond with tree information including block information stored in the spare region of a first page of the block. Particularly, the update area 332 may be restored by reading logical addresses and sector information of its corresponding block. This scanning operation for the free blocks is carried out until detecting a garbage block. After reading tree information or block mapping information for all free blocks, the recovery of the block mapping table is completed. Based on the recovered block mapping table, a tree structure of the file system can be mounted on the RAM.

The scanning operation includes reading data from block information areas of the flash memory device, deciphering the readout data, and determining whether there is a garbage mark. The scanning operation continues until finding a garbage mark (GM) that is stored in the block information area of the flash memory device. If the garbage mark (GM) is found out, the mapping table up to the corresponding block is restored. Namely, the block mapping table of the time of the flush or garbage collection before the power loss is restored by way of the sequence with WSBL. Further, mapping information from the time of the flush or garbage collection to the time of power loss is restored through the scanning operation of the remaining blocks. Here, while the scanning operation of the spare region for the free block is progressed up to a time finding the garbage mark (GM), it is permissible to scan only blocks signified by WSBL_mark (0xA5) as free blocks.

Figure 7:
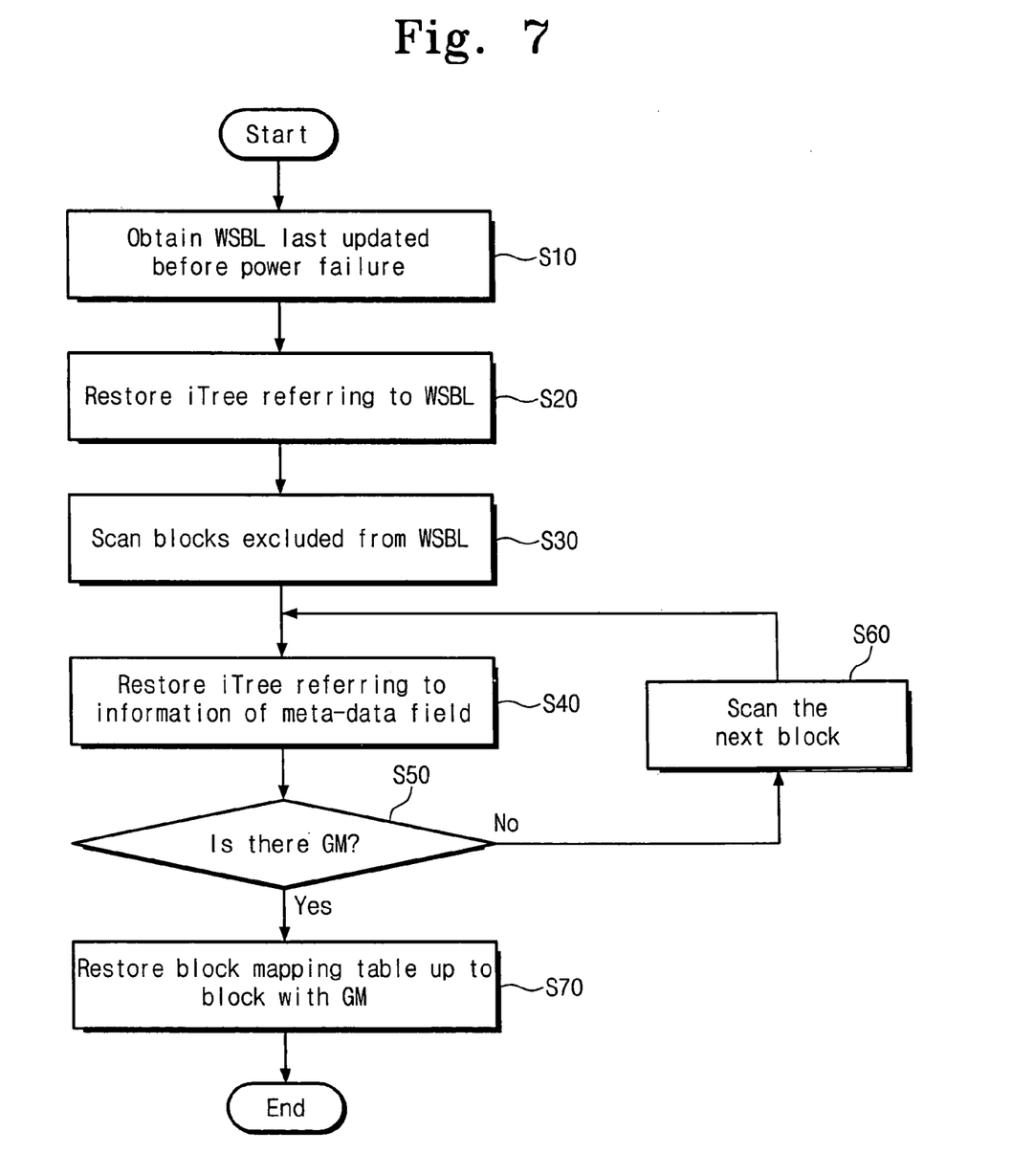
FIG. 7 is a flow chart illustrating an operational procedure of a recovery method of a block mapping table in accordance with an embodiment of the present invention.

FIG. 7 is a flow chart showing an operational procedure of the recovery method for block mapping table by the present invention. Referring to FIG. 7, it will be described procedures for first restoring the block mapping table by way of the sequence with WSBL, and subsequently restoring the rest mapping information by way of the block scanning operation, along time. A sequence of restoring the block mapping table will be detailed in conjunction with the accompanying figures hereinafter.

If the system is rebooted due to an inadvertent power loss, a data recovery operation begins by a file manager (or firmware). Once the data recovery operation starts, the latest updated WSBL before the power loss is read out from the WSBL region of the flash memory device (S10). With reference to EC (i.e., an erasing count) included in the readout WSBL, the system restores the block mapping table corresponding to the update time. The WSBL is updated on the RAM at a time of generating an flush or garbage collection operation, and then programmed into the meta-data field 30 of the flash memory device. Therefore, the system should be set to read the WSBL in the rebooting mode due to the inadvertent power loss. The block mapping table formed on the RAM is first completed in accordance with the order of EC of all blocks designated by the WSBL (S20). After completing the recovery of the block mapping table referring to the readout WSBL, the scanning operation is carried out with respect to physical blocks, which have still not been designated by the WSBL, in order to obtain mapping information. This scanning operation begins to read block information areas for the blocks undefined by the WSBL (S30). Then, block mapping information included in the spare region of the physical block undefined by the WSBL is read and added to the block mapping table composed on the RAM (S40). If a garbage mark is found from scanning the block information area of each block, the sequence of restoring the block mapping table is carried out up to the block having the garbage mark. Thus, it detects whether the garbage mark is present (S50). If there is no garbage mark (GM) in the scanned block, the procedure of the scanning operation moves to the remaining blocks undefined by the WSBL. Then, it reads mapping data included in the block information area for the moved block and updates the block mapping table of the RAM on basis of the readout mapping data (S60). Upon detecting a block having a garbage mark (GM), the recovery procedure for the overall mapping table is completed by providing the block mapping table of the RAM with the mapping information up to the block signified by the garbage mark (S70).

Figure 8:
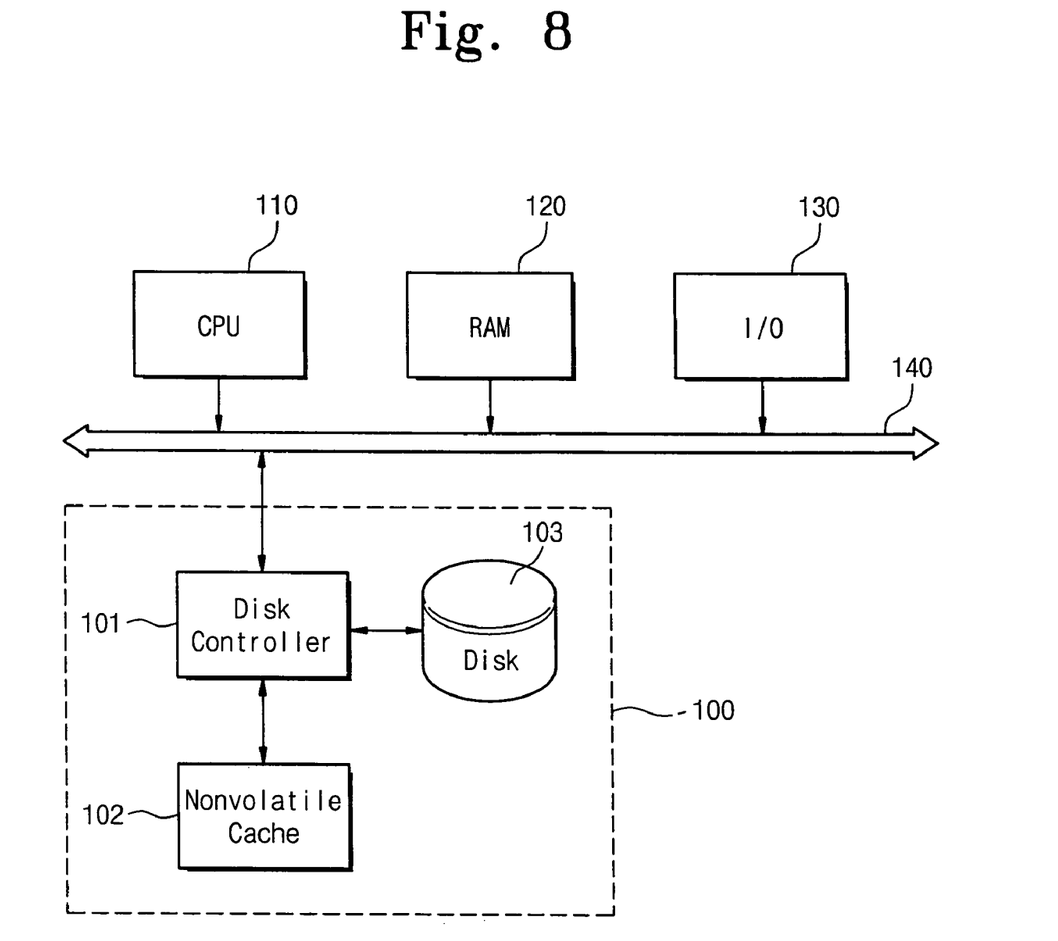
FIG. 8 is a block diagram schematically illustrating a system operable in a recovery method of a block mapping table in accordance with an embodiment of the present invention.

FIG. 8 is a block diagram schematically illustrating an example of a computer system operable in the aforementioned recovery function for a block mapping table in accordance with embodiments the present invention. Referring to FIG. 8, the computer system includes a central processing unit 110, a RAM (i.e, corresponding to the aforementioned RAM) 120, an input/output device 130, and a hybrid hard disk 100 using a flash memory device as a writing cache (i.e., a nonvolatile cache memory 102). In a rebooting mode due to an inadvertent power loss, the system restores the block mapping table by reading the WSBL from the nonvolatile cache memory 102 of the flash memory device. Further, blocks unallocated by the WSBL may be recovered through a scanning operation conducted up to the time of detecting a garbage mark (GM). The hybrid hard disk 100 is generally supplied with commands, addresses, and data by way of a system bus 130. A disk controller 101 temporarily stores data to be provided into the nonvolatile cache memory 102 and flushes cache data into a magnetic disk 103 at the time when the nonvolatile cache memory 102 is unable to further store data. Further, the disk controller 101 maps physical addresses of the flash memory device in correspondence with logical addresses provided from the central processing unit 110 or an operating system.

When an inadvertent power loss occurs, the system reads the programmed WSBL from the nonvolatile cache memory 102 and allocates physical block addresses to the block mapping table composed in the RAM 120 with reference to EC included in the WSBL. Further, the system reads the block information area for blocks undefined by the WSBL. This operation for reading the block information area is continued until detecting a block with a garbage mark.

Through the aforementioned scheme, the system is able to rapidly restore the block mapping data or table when an inadvertent power loss occurs. While the system is rebooting, the latest update WSBL is invoked from the nonvolatile cache memory 102 and then the block mapping data is first restored with reference to the ESBL. Further, the recovery operation for restoring mapping information for the remaining blocks is carried out until detecting a garbage mark from the remaining blocks.

As described above, according to the recovery scheme by the present invention, it is possible to implement a cache memory capable of enhancing an operation speed when restoring a block mapping table or data of a flash memory device. Moreover, it is possible to reduce overhead of cache operations since there is no need to restore additional mapping information into the flash memory device.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method for recovering a block mapping table in a system including a flash memory device, the block mapping table utilizing address mapping in accordance with a wear-leveling scheme, the method comprising:

reading block arrangement information from the flash memory device for the wear-leveling scheme;

restoring the block mapping table with reference to allocation block information included in the block arrangement information;

scanning address allocation information included in spare regions of erased blocks of the flash memory device with reference to erased block information included in the block arrangement information and updating the block mapping table in accordance with the scanned address allocation information, wherein the block arrangement information is arranged in order of erase counts, and wherein blocks with the smallest erase counts are first allocated to logical block addresses provided from a host.

2. The method as set forth in claim 1, wherein the block arrangement information includes information indicative of the erase counts of each block of the flash memory device.

3. The method as set forth in claim 1, wherein the block mapping table is composed in a random access memory of the system.

4. The method as set forth in claim 1, wherein the block arrangement information includes:
information indicative of blocks preliminarily allocated to logical block addresses and arranged in an order of the erasing counts;
free block information containing information indicative of erased blocks and arranged in an order of the erase counts; and
information indicative of garbage blocks storing duplicate or invalid data.

5. The method as set forth in claim 4, wherein the scanning of address allocation information is carried out excluding the garbage blocks.

6. The method as set forth in claim 5, spare regions of the garbage blocks include garbage marks indicative of a garbage block status.

7. A memory system comprising:
a nonvolatile memory device which stores block arrangement information;
a central processing unit; and
a random access memory which stores a block mapping table configured to allocate physical block addresses of the nonvolatile memory device in correspondence with logical block addresses provided from the central processing unit, the block mapping table utilizing address mapping in accordance with a wear-leveling scheme,
wherein the central processing unit restores the block mapping table with reference to allocation block information included in the block arrangement information of the nonvolatile memory device, locates address information included in spare regions of erased blocks with reference to erased block information, and updates the block mapping table according to the located address information,
wherein the block arrangement information is arranged in order of erase counts, and wherein blocks with the smallest erase counts are first allocated to logical block addresses provided from the central processing unit.

8. The memory system as set forth in claim 7, wherein the block arrangement information comprises the address information arranged in accordance with the erase counts of blocks of the nonvolatile memory device,
wherein the address information includes allocation block information indicative of blocks storing valid data, erased block information indicative of the erased blocks, and garbage block information indicative of blocks storing invalid data.

9. The memory system as set forth in claim 8, wherein the block arrangement information is updated in the nonvolatile memory device from the random access memory during a garbage collection operation.

10. The memory system as set forth in claim 9, wherein the block mapping table is defined by a tree structure including a data architecture of the nonvolatile memory device.

11. The memory system as set forth in claim 10, wherein the tree structure is periodically stored in the nonvolatile memory device.

12. The memory system as set forth in claim 7, wherein the nonvolatile memory device comprises a NAND flash memory device.

13. The memory system as set forth in claim 7, wherein the nonvolatile memory device comprises an oneNAND flash memory device.

14. The memory system as set forth in claim 7, further comprising an input/output device for conducting data input/output operations.

15. The memory system as set forth in claim 14, further comprising a system bus interconnecting the input/output device, the central processing unit, the random access memory, and the nonvolatile memory device.

16. A system comprising:
a central processing unit;
a hybrid hard disk which stores data and includes a nonvolatile cache memory; and
a random access memory which stores a block mapping table configured to allocate physical block addresses of the nonvolatile cache memory in correspondence with logical block addresses provided from the central processing unit, the block mapping table utilizing address mapping in accordance with a wear-leveling scheme,
wherein the central processing unit restores the block mapping table with reference to allocation block information included in the block arrangement information of the nonvolatile cache memory, locates address information included in spare regions of erased blocks with reference to erased block information, and updates the block mapping table according to the located address information,
wherein the block arrangement information is arranged in order of erase counts, and wherein blocks with the smallest erase counts are first allocated to logical block addresses provided from the central processing unit.

17. The system as set forth in claim 16, wherein the hybrid hard disk comprises:
a magnetic disk which stores cache data of the nonvolatile cache memory; and
a disk controller which interfaces external data and controls the cache data to be flushed into the magnetic disk from the nonvolatile cache memory.

18. The system as set forth in claim 17, wherein the block arrangement information comprises the address information arranged in accordance with the erase count of blocks of the nonvolatile memory device,
wherein the address information includes allocation block information indicative of blocks storing valid data, erased block information indicative of the erased blocks, and garbage block information indicative of blocks storing invalid data.

19. The system as set forth in claim 18, wherein the block arrangement information is updated into the nonvolatile cache memory from the random access memory during a flush operation or an garbage collection operation.

20. The system as set forth in claim 18, wherein the block mapping table is defined by a tree structure including a data architecture of the nonvolatile cache memory.

21. The system as set forth in claim 20, wherein the tree structure is periodically updated in the nonvolatile cache memory.

22. The system as set forth in claim 16, wherein the nonvolatile cache memory comprises a NAND flash memory.

23. The system as set forth in claim 16, wherein the nonvolatile cache memory comprises an oneNAND flash memory.

24. The system as set forth in claim 16, further comprising an input/output device for conducting data input/output operations.

25. The system as set forth in claim 24, further comprising a system bus which interconnects the input/output device, the central processing unit, the random access memory, and the hybrid hard disk.

* * * * *